US010448383B2

(12) United States Patent
Luo et al.

(10) Patent No.: US 10,448,383 B2
(45) Date of Patent: Oct. 15, 2019

(54) RESOURCE INDICATION PROCESSING METHOD, COMPUTER READABLE MEDIUM, ACCESS POINT AND STATION

(71) Applicant: Huawei Technologies Co., Ltd., Shenzhen (CN)

(72) Inventors: Jun Luo, Shanghai (CN); Jiayin Zhang, Ottawa (CA); Yingpei Lin, Shanghai (CN); Phillip Barber, McKinney, TX (US); Le Liu, Shenzhen (CN); Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 15/593,533

(22) Filed: May 12, 2017

(65) Prior Publication Data

US 2017/0251458 A1 Aug. 31, 2017

Related U.S. Application Data

(63) Continuation of application No. PCT/CN2014/090897, filed on Nov. 12, 2014.

(51) Int. Cl.
*H04W 72/04* (2009.01)
*H04W 72/00* (2009.01)
(Continued)

(52) U.S. Cl.
CPC ......... *H04W 72/042* (2013.01); *H04L 1/0003* (2013.01); *H04L 1/0009* (2013.01);
(Continued)

(58) Field of Classification Search
CPC ......... H04L 1/00; H04L 27/26; H04L 1/0003; H04L 1/0009; H04L 27/2602;
(Continued)

(56) References Cited

U.S. PATENT DOCUMENTS

2009/0252110 A1   10/2009   Sridhara et al.
2011/0002319 A1*  1/2011    Husen ................. H04W 72/042
                                                        370/338
(Continued)

FOREIGN PATENT DOCUMENTS

CN   101960899 A   1/2011
CN   102301807 A   12/2011
(Continued)

OTHER PUBLICATIONS

IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 4: Enhancements for Very Higher Throughout for Operation in Bands below 6 GHz, IEEE Std 802.11ac-2013, IEEE Computer Society, Sponsored by LAN/MAN Standards Committee, Dec. 11, 2013, 425 pages.
(Continued)

*Primary Examiner* — Kyaw Z Soe
(74) *Attorney, Agent, or Firm* — Slater Matsil, LLP

(57) ABSTRACT

A resource indication method in a wireless local area network is provided, where the method includes generating, by an access point, a data frame that includes a preamble, where the preamble includes a signaling indication part B (SIG-B), the SIG-B includes a common part and a user part following the common part. The common part is used to indicate a quantity of scheduled stations, identification information of the scheduled station, and a location of communication resource information of the scheduled station in the user part, the user part is used to indicate the communication resource information of the scheduled station, and the communication resource information includes resource indication information, MCS information of a data part, spatial
(Continued)

flow quantity information, or power control information; and sending the data frame.

8 Claims, 10 Drawing Sheets

(51) Int. Cl.
| | | |
|---|---|---|
| *H04L 1/00* | (2006.01) | |
| *H04L 27/26* | (2006.01) | |
| *H04W 72/12* | (2009.01) | |
| *H04W 84/12* | (2009.01) | |

(52) U.S. Cl.
CPC ......... *H04L 27/2602* (2013.01); *H04W 72/00* (2013.01); *H04W 72/1289* (2013.01); *H04W 84/12* (2013.01)

(58) Field of Classification Search
CPC ... H04W 72/12; H04W 72/00; H04W 72/042; H04W 72/1289
See application file for complete search history.

(56) References Cited

U.S. PATENT DOCUMENTS

| | | | |
|---|---|---|---|
| 2011/0170627 A1 | 7/2011 | Kwon et al. | |
| 2011/0299468 A1* | 12/2011 | Van Nee | H04L 27/2613 370/328 |
| 2015/0222339 A1* | 8/2015 | Park | H04B 7/0452 375/267 |

FOREIGN PATENT DOCUMENTS

| | | |
|---|---|---|
| CN | 102714631 A | 10/2012 |
| CN | 103096489 A | 5/2013 |
| EP | 2263407 A1 | 12/2010 |
| WO | 2009109894 A1 | 9/2009 |

OTHER PUBLICATIONS

Hemanth Sampath et al., "80211ac Preamble,", XP017676497, IEEE 802.11-10/876r0, Jul. 13, 2010, 18 pages.

* cited by examiner

RESOURCE INDICATION PROCESSING METHOD, COMPUTER READABLE MEDIUM, ACCESS POINT AND STATION

CROSS-REFERENCE TO RELATED APPLICATIONS

This application is a continuation of International Application No. PCT/CN2014/090897, filed on Nov. 12, 2014, the disclosure of which is hereby incorporated by reference in its entirety.

TECHNICAL FIELD

Embodiments of the present invention relate to the field of wireless communications technologies, and more specifically, to a resource indication processing method, a computer readable medium, an access point, and a station.

BACKGROUND

With the development of mobile Internet and the popularity of intelligent terminals, data traffic increases rapidly. A wireless local area network (WLAN) becomes one of mainstream mobile broadband access technologies due to advantages of a high rate and low costs.

To significantly improve a service transmission rate of a WLAN system, in next-generation Institute of Electrical and Electronics Engineers (IEEE) 802.11ax standards, an orthogonal frequency division multiple access (OFDMA) technology is further used based on an existing orthogonal frequency division multiplexing (OFDM,) technology. In the OFDMA technology, air interface radio channel time-frequency resources are divided into multiple orthogonal time-frequency resource blocks (RB). The RBs may share time and are orthogonal in a frequency domain.

The OFDMA technology supports simultaneous data transmission and reception of multiple nodes. When an access point needs to transmit data to a station, resources are allocated based on an RB or an RB group. Different channel resources are allocated to different STAs at a same moment, so that multiple STAs efficiently access channels and channel utilization is improved. For a WLAN system based on OFDMA, a time-frequency resource needs to be indicated to the STA efficiently.

SUMMARY

Embodiments of the present invention provide an information transmission method, an access point, and a station, so as to efficiently indicate a communication resource to a station.

According to an aspect, a resource indication method in a wireless local area network is provided, and the method includes: generating, by an access point, a data frame that includes a preamble, where the preamble includes a signaling indication part B (SIG-B), the signaling indication part B SIG-B includes a common part and a user part following the common part, the common part is used to indicate information used for determining an end location or an end time of the common part, identification information of the scheduled station, and a location of communication resource information of the scheduled station in the user part, the user part is used to indicate the communication resource information of the scheduled station, and the communication resource information includes resource indication information, modulation and coding scheme (MCS) information of a data part, spatial flow quantity information, or power control information; and sending the data frame.

According to another aspect, a resource indication processing method in a wireless local area network is provided and includes: receiving, by a station, a data frame, where a preamble of the data frame includes a SIG-B, the SIG-B includes a common part and a user part following the common part, the common part is used to indicate information used for determining an end location or an end time of the common part, identification information of the scheduled station, and a location of communication resource information of the scheduled station in the user part, the user part is used to indicate the communication resource information of the scheduled station, and the communication resource information includes resource indication information, MCS information of a data part, spatial flow quantity information, or power control information; and decoding the common part of the SIG-B, determining whether the station is included in the scheduled station, and performing corresponding processing: when it is determined that the station is not in the scheduled station, stopping decoding; or when it is determined that the station is in the scheduled station, jumping to the location of the communication resource information of the scheduled station in the user part and decoding the communication resource information of the scheduled station.

Correspondingly, an access point and a station are further provided to perform the foregoing methods.

Specifically, the access point includes: a processing unit, configured to generate a data frame that includes a preamble, where the preamble includes a SIG-B, the SIG-B includes a common part and a user part following the common part, the common part is used to indicate information used for determining an end location or an end time of the common part, identification information of the scheduled station, and a location of communication resource information of the scheduled station in the user part, the user part is used to indicate the communication resource information of the scheduled station, and the communication resource information includes resource indication information, MCS information of a data part, spatial flow quantity information, or power control information; and a transceiver, configured to send the data frame.

The station includes: a transceiver, configured to receive a data frame, where a preamble of the data frame includes a SIG-B, the SIG-B includes a common part and a user part following the common part, the common part is used to indicate information used for determining an end location or an end time of the common part, identification information of the scheduled station, and a location of communication resource information of the scheduled station in the user part, the user part is used to indicate the communication resource information of the scheduled station, and the communication resource information includes resource indication information, MCS information of a data part, spatial flow quantity information, or power control information; and a processing unit, configured to: decode the common part of the SIG-B, determine whether the station is included in the scheduled station, and perform corresponding processing: when it is determined that the station is not in the scheduled station, stopping decoding; or when it is determined that the station is in the scheduled station, jumping to the location of the communication resource information of the scheduled station in the user part and decoding the communication resource information of the scheduled station.

Preferably, with reference to the foregoing different aspects, the common part may be identification information that is of the scheduled station and that is arranged in order, for example, an identification information list of the scheduled station. The identification information of the scheduled station may be arranged at random, or the identification information of the scheduled station may be preferably arranged in ascending order or descending order. More specifically, the common part includes a first part with a fixed length and a second part with a non-fixed length that follows the first part. Alternatively, the common part and the user part may each include corresponding content of an uplink user and corresponding content of a downlink user that are mutually independent.

In the foregoing indication manner, a time-frequency resource can be efficiently indicated to a station, and a speed of searching for content of a communication resource indication field (for example, referred to as a SIG-B) by the station can be improved. In another aspect, an unscheduled station may not search for and interpret the content of the SIG-B any longer. This is beneficial to capability saving of a station without scheduling information.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present embodiments.

An access point (AP) may also be referred to as a wireless access point, a bridge, a hotspot, or the like, and may access a server or a communications network.

A station (STA) may also be referred to as a user, and may be a wireless sensor, a wireless communication terminal, or a mobile terminal, for example, a mobile phone that supports a WiFi communication function (or referred to as a "cellular" phone) and a computer that has a wireless communication function). For example, the station may be a portable, pocket-sized, handheld, computer built-in, wearable, or vehicle-mounted wireless communication apparatus that supports a WiFi communication function and that exchanges communication data such as a voice or data with wireless access network. A person skilled in the art is aware that some communication devices may have functions of both the access point and the station. This is not limited herein.

Figure 1A:
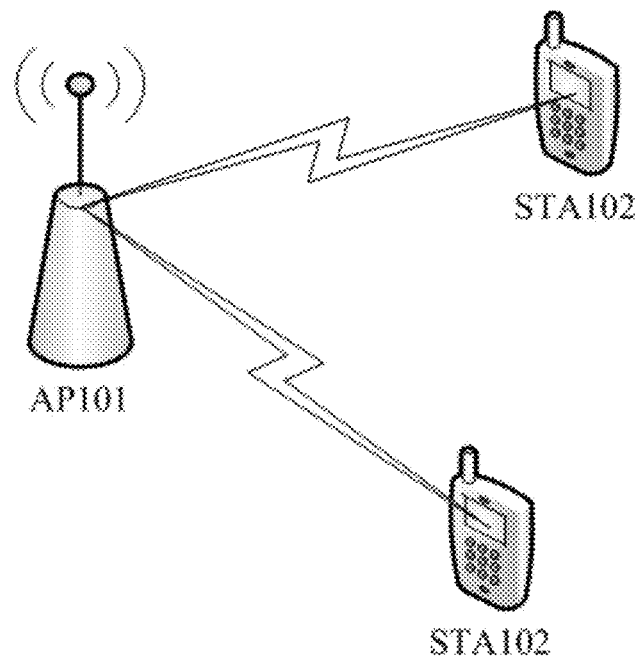
FIG. 1A is a schematic diagram of an applicable system architecture according to an embodiment of the present invention.

FIG. 1a is a simple schematic diagram of a wireless local area network (WLAN) system applied to an implementation manner of the present embodiments. The system in FIG. 1 includes one or more access points AP 101, and one or more stations STA 102. Wireless communication may be performed between the access point 101 and the station 102 by using an OFDMA technology, and a data frame sent by the access point 101 includes indication information for a time-frequency resource of the station 102.

Figure 1B:
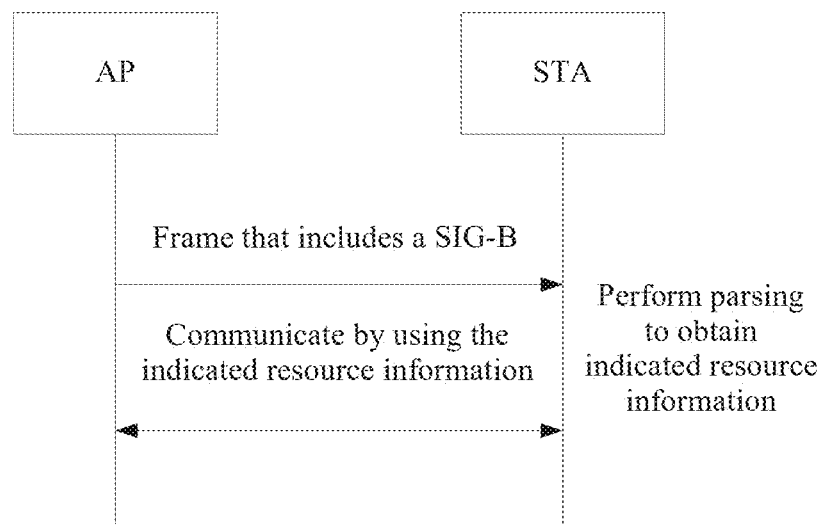
FIG. 1B is an applicable schematic flowchart according to an embodiment of the present invention.

Specifically, referring to FIG. 1b, an implementation manner of the present embodiments provides a resource indication method that is applied to a wireless local area network in which an orthogonal frequency division multiple access (OFDMA) technology is used. An access point sends a frame that includes a communication resource indication field to a station. The communication resource indication field includes a user identifier and a communication resource corresponding to the user identifier, such as resource indication information (resource block information), modulation and coding scheme (MCS) information of a data part, spatial flow quantity information, or power control information transmission power control (TPC). Correspondingly, after receiving the frame that includes the communication resource indication field, the station decodes the communication resource indication field to obtain communication resource information, and performs communication by using the communication resource information. Specifically, if the STA obtains the resource block information, the STA subsequently performs communication by using a corresponding resource block. If the STA obtains the MCS information, that is, obtains an adjustment and coding manner corresponding to data transmission and reception, the STA subsequently performs transmission and reception by using the MCS. If the STA obtains the spatial flow quantity information, the STA may transmit data by using a corresponding spatial flow quantity. After obtaining the TPC information, the STA may perform transmission by using adjusted transmit power.

Figure 2:
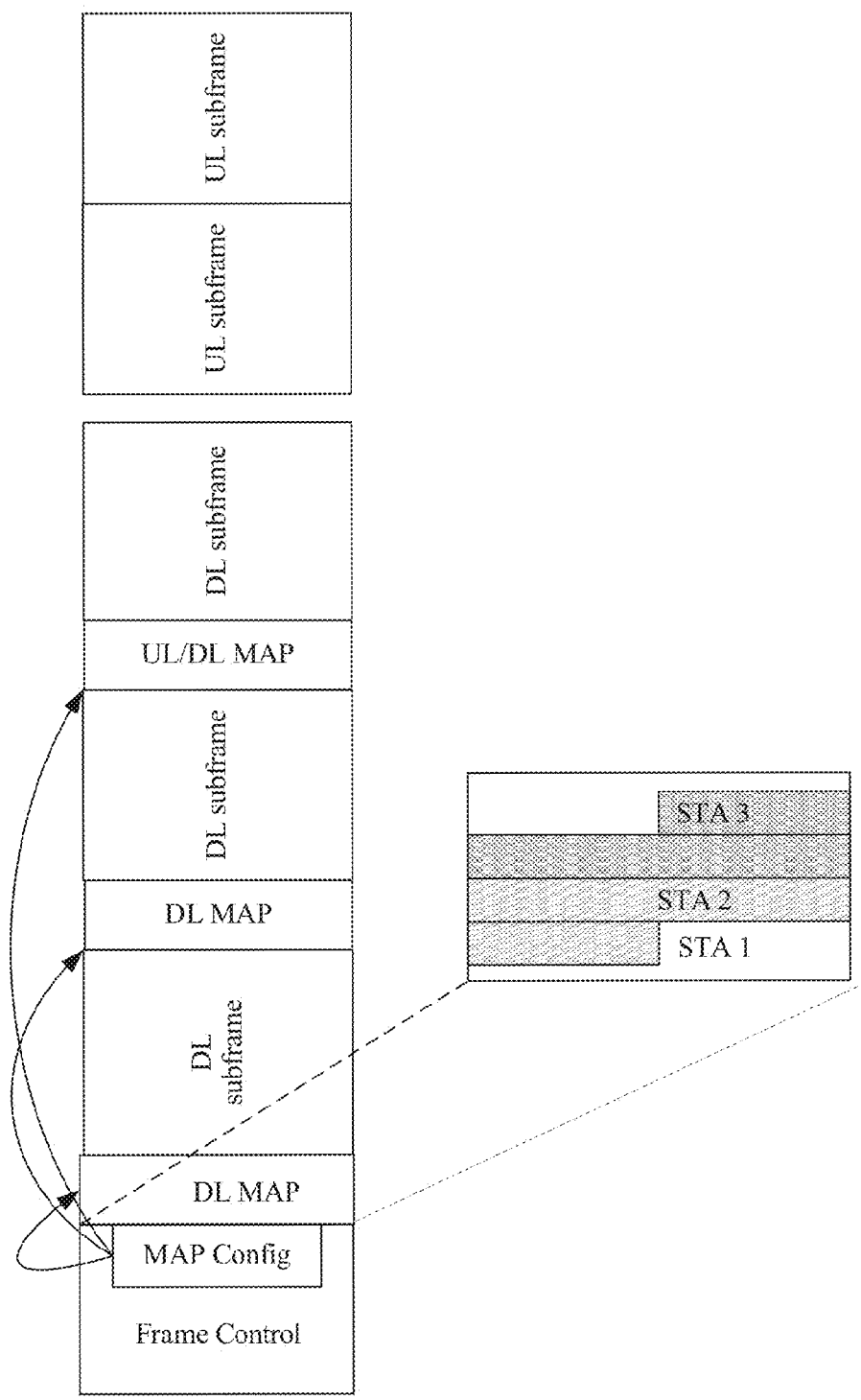
FIG. 2 is a schematic diagram of a frame used for resource indication according to an embodiment of the present invention.

Referring to FIG. 2, an implementation manner of the present embodiments provides a frame that is applied to a wireless local area network and that is used for resource indication. As shown in FIG. 2, a data frame includes a control field (for example, referred to as Frame control, or SIG-A), and the control field includes "resource indication"

configuration information (for example, referred to as MAP Config). The data frame further includes a "resource indication" field (for example, a downlink (DL) MAP field, an uplink (UL) MAP field, a UL/DL MAP field, or a SIG-B field in FIG. 2), and the "resource indication" field includes resource indication for a time-frequency resource of one or more stations 102.

For a specific structure of the foregoing data frame used for resource indication in a communications system, reference may be made to the patent application PCT/CN2014/080976 filed on Jun. 27, 2014 and the patent application PCT/2014/082437 filed on Jul. 17, 2014 that are of the applicant, which are incorporated herein by reference in their entirety.

Preferably, in a resource indication information sending method according to this implementation manner of the present embodiments, a "resource indication" field (for example, specifically, a SIG-B) is divided into a common part (common part) and a user part (STA-specific part, or per-STA part) in a preamble of a data frame, and identifiers of all scheduled stations are centrally placed in the common part. The user part is used to indicate communication resource information of the scheduled station, so that each STA learns, by reading the common part, whether the STA is scheduled, and an order or a location of the STA in the user part. In this solution, the STA first reads the common part, and then reads a corresponding user part according to indication in the common part, so that not only resource indication information of the STA can be obtained quickly, but energy consumption of the STA can also be reduced.

Alternatively, it may be understood in such a manner that this implementation manner provides the following method: on a transmit side, generating and sending a data frame that includes a preamble, where the preamble includes a signaling indication part B (SIG-B), the SIG-B includes a common part and a user part following the common part, the common part is used to indicate information used for determining an end location or an end time of the common part, identification information of the scheduled station, and a location of communication resource information of the scheduled station in the user part, the user part is used to indicate the communication resource information of the scheduled station, and the communication resource information includes resource indication information, MCS information of a data part, spatial flow quantity information, or power control information; and correspondingly, on a receive side, after receiving the foregoing data frame, decoding the common part of the SIG-B, determining whether the station is included in the scheduled station, and performing corresponding processing: when it is determined that the station is not in the scheduled station, stopping decoding; or when it is determined that the station is in the scheduled station, jumping to the location of the communication resource information of the scheduled station in the user part and decoding the communication resource information of the scheduled station.

Figure 3:
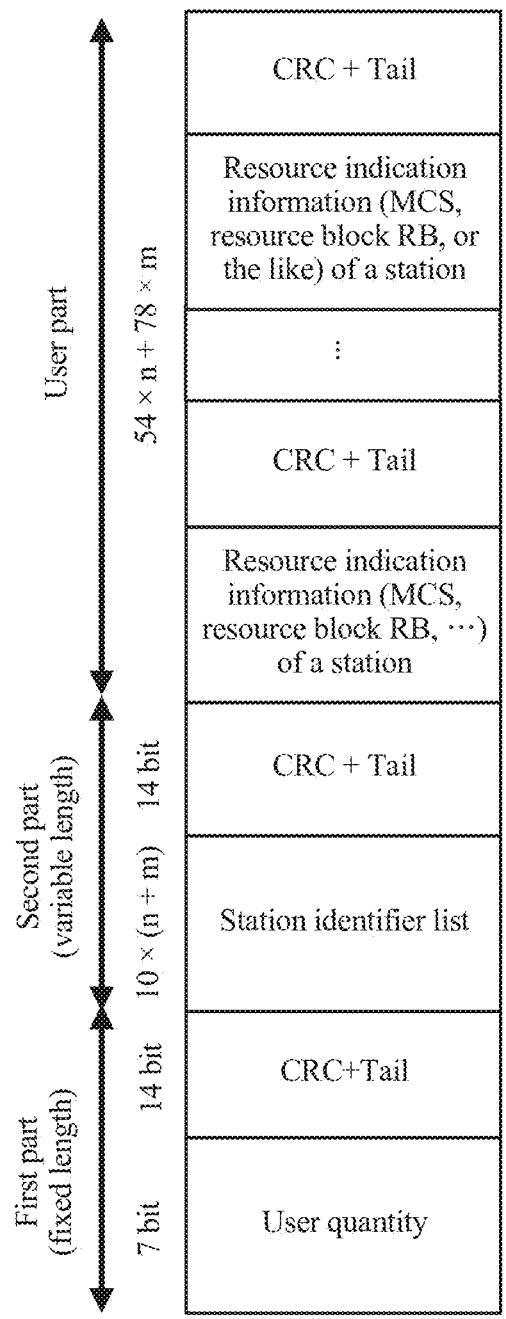
FIG. 3 is a schematic diagram of a signaling indication part B (SIG-B) according to an embodiment of the present invention.

Referring to FIG. 3, FIG. 3 is a schematic structural diagram of a SIG-B part. In description of Embodiment 1 of the present invention, a SIG-B part of a preamble of a data frame that conforms to a future wireless local area network protocol is divided into two parts: a common part and a user part. The common part includes a first part and a second part. The first part includes quantity information of a scheduled station, and the second part includes identification information (for example, a STA identifier (ID) list or a character string) that is of the scheduled station and that is in order. The user part includes resource indication information of each scheduled station.

Figure 4:
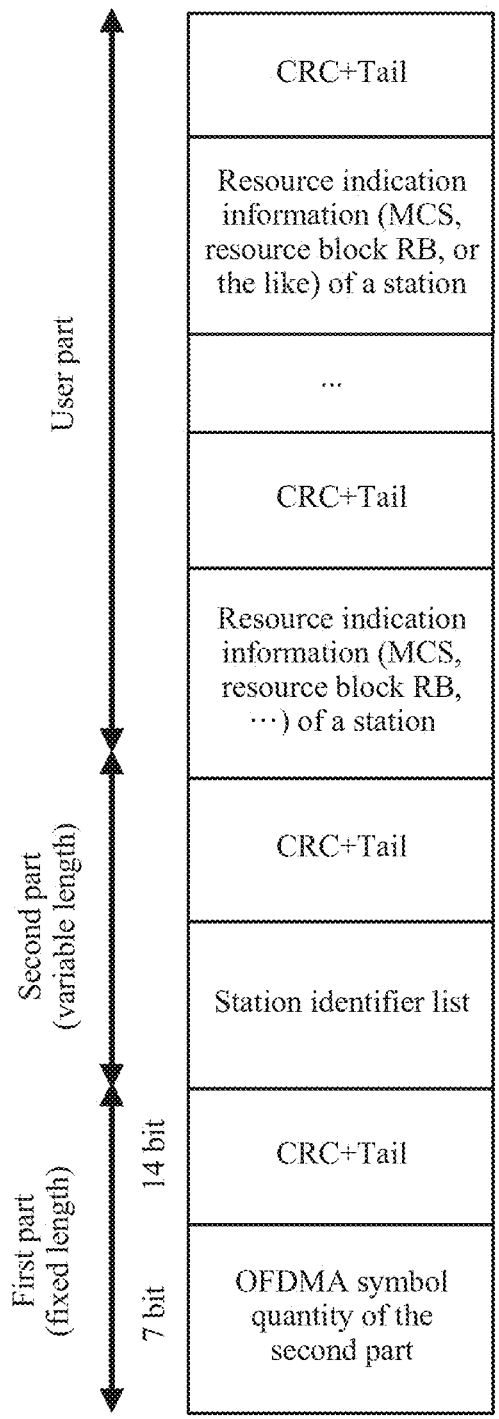
FIG. 4 is a schematic diagram of a SIG-B according to an embodiment of the present invention.

Referring to FIG. 4, FIG. 4 is a schematic structural diagram of another SIG-B part. In another implementation manner, a difference from the implementation manner shown in FIG. 3 is: a first part of a common part includes OFDMA symbol information of the common part or OFDMA symbol information of a second part of the common part, and the OFDMA symbol information may be an OFDMA symbol quantity, or may be an OFDMA symbol end time. Sometimes, the symbol quantity may also be referred to as a length, that is, the first part of the common part includes a length of the common part or a length of the second part of the common part.

It should be noted that, based on the foregoing content of the first part, the receive side may determine or calculate the length of the common part, or an end location or an end time of the common part.

Referring to FIG. 3 or FIG. 4, it may be learned that, for one scheduling, the first part of the common part has a fixed length, for example, a total of 21 bits. Certainly, the first part of the common part may have another length, and the fixed part is used to carry a quantity of scheduled stations or the OFDMA symbol information of the common part (or the second part of the common part). The second part has a variable length, for example, a length of the second part shown in FIG. 3 is related to a type of the scheduled station and the quantity of scheduled stations. The type of the scheduled station includes: a single user that is scheduled in OFDMA scheduling refers to a case in which a specific resource block in an OFDMA technology is allocated to a single user, and the single user is referred to as an OFDMA user for short in the following; and a multiple-user multiple-input multiple-output (MU-MIMO) user in one OFDMA scheduling refers to a case in which a specific resource block in an OFDMA technology is allocated to multiple users for use, and the multiple users are referred to as an MU-MIMO user for short in the following.

In the frame structure shown in FIG. 3, a relationship between the length of the second part and both the type of the scheduled station and the quantity of scheduled stations may be: Length of the second part=10×(n+m), where n is a quantity of scheduled single users in one OFDMA scheduling, and m is a quantity of MU-MIMO users in one OFDMA scheduling. Certainly, the length of the second part and both the type of the scheduled station and the quantity of scheduled stations may be in another proper relationship. It may be understood herein that, because the length of the first part is fixed, obtaining the length of the second part is equivalent to obtaining the length, the end location, or the end time of the common part. Specifically, on a receive side, a STA first reads the first part and may obtain the length of the second part by using the foregoing relationship, and then can obtain the end location or the end time of the common part (or the second part) when reading the second part. In the implementation manner of the frame structure shown in FIG. 4, on a receive side, after first reading the first part, a STA determines the end time or the end location of the common part (or the second part) according to the OFDMA symbol quantity of the common part (or the second part of the common part) or the OFDMA symbol end time of the common part (or the second part of the common part).

Content of the second part of the common part mentioned above is described in detail in the following. Identification information of the scheduled station in the second part of the common part may be STA ID information of an OFDMA scheduled single user, for example, a STA ID of a station, or a partial ID of a station; or group ID information of an MU-MIMO group user.

Preferably, referring to Table 1-1 or Table 1-2, the identification information of the scheduled station may implicitly indicate a STA ID order, for example, identification information that is of the scheduled station and that is arranged in order such as in a list form or a character string form. In this way, fewer overheads may be occupied. Certainly, a STA ID order or a STA ID location may be explicitly indicated. It should be noted that an order of communication resource information of the scheduled station in the user part is the same as an order of the identification information that is of the scheduled stations and that is indicated in the common part, so that a location of the communication resource information of the scheduled station in the user part is determined according to the order of the identification information of the scheduled station.

In a specific example, when the STA ID order is implicitly indicated, in a STA ID list, STA IDs may be arranged in a size order or arranged at random.

Preferably, identifiers of the scheduled station are arranged in ascending order. In this case, the determining whether the station is included in the scheduled station specifically includes: reading the identifiers of the scheduled station in order, and if an identifier of the station is read, determining that the station is in the scheduled station, or if the first station whose identifier is greater than an identifier of the station is read, determining that the station is not in the scheduled station.

Alternatively, preferably, identifiers of the scheduled station are arranged in descending order. In this case, the determining whether the station is included in the scheduled station specifically includes: reading the identifiers of the scheduled station in order, and if an identifier of the station is read, determining that the station is in the scheduled station, or if the first station whose identifier is less than an identifier of the station is read, determining that the station is not in the scheduled station.

When identifiers of the scheduled station are arranged at random, the station needs to decode the entire STA ID list to determine whether the station is included in the scheduled station. Apparently, the foregoing method of arranging station identifiers in ascending order or descending order can further reduce a computing resource of a system, and shorten reading time.

TABLE 1-1

| STA ID 1 |
| STA ID 2 |
| STA ID 3 |
| STA ID 4 |
| STA ID 5 |

TABLE 1-2

| 1 | STA ID 1 |
| 2 | STA ID 2 |
| 3 | STA ID 3 |
| 4 | STA ID 4 |
| 5 | STA ID 5 |

Certainly, alternatively, the foregoing common part of a communication resource indication field may explicitly indicate a STA ID of a scheduled STA and a location of corresponding resource indication information of the scheduled STA. For example, referring to Table 1-3, such a location indicator may be a location of a time-frequency resource in the user part, for example, may be an offset value. For this solution, specific overheads are occupied in scheduling information, but a station (if the station is a scheduled station) on a receive side may directly obtain a location of a resource indicator of the station in the user part, and jump to the location to perform decoding. The scheduled station can save a computing resource.

TABLE 1-3

| STA ID 1 | Location 1 |
| STA ID 2 | Location 2 |
| STA ID 3 | Location 3 |
| STA ID 4 | Location 4 |

Figure 5:
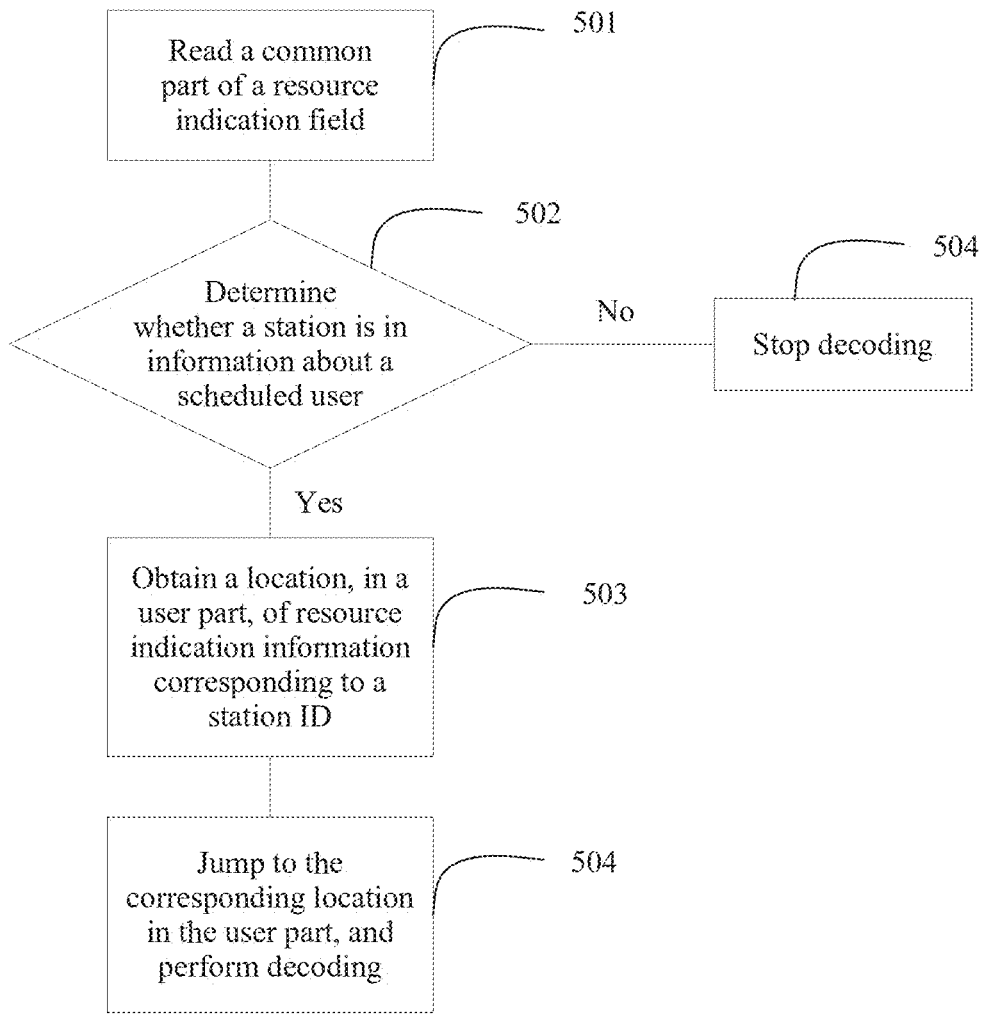
FIG. 5 is a schematic flowchart for resource indication processing according to another embodiment of the present invention.

Several SIG-B data structures are described above. After an access point sends a frame including the foregoing described communication resource indication field, a STA receives the frame including the foregoing described communication resource indication field and performs processing. Referring to FIG. 5, FIG. 5 is a schematic flowchart of processing a communication resource indication field (or referred to as a SIG-B) by a STA.

501. After receiving a frame including a SIG-B, a station first reads a common part of the SIG-B.

502. Determine whether the station is in identification information of a scheduled station, and if the station is in the identification information of the scheduled station, perform steps 503 and 504, or if the station is not in the identification information of the scheduled station, perform step 506 of stopping decoding.

503. Obtain a location, in a user part, of resource indication information corresponding to an identifier of the station.

504. Jump to the corresponding location in the user part to perform decoding.

Figure 6:
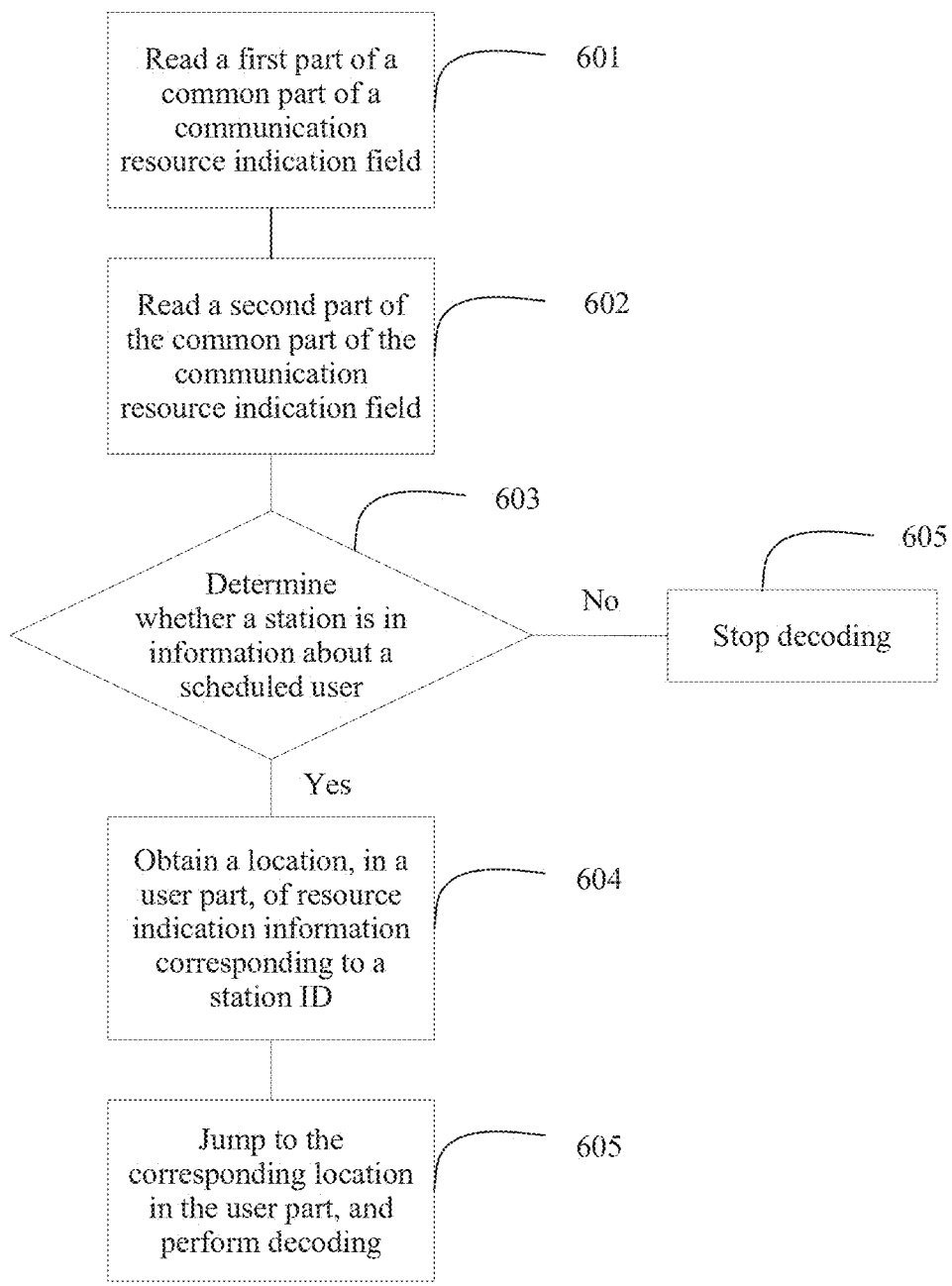
FIG. 6 is a schematic flowchart used for resource indication according to an embodiment of the present invention.

More specifically, refer to FIG. 6. FIG. 6 is a schematic flowchart of processing, by a STA, a frame including a SIG-B. The STA receives the frame, shown in FIG. 3 or FIG. 4, that includes a communication resource indication field.

601. First read a first part of a common part of the communication resource indication field.

602. Then read a second part of the communication resource indication field.

603. Determine whether the STA is in information of a scheduled station, and if a STA ID list includes an ID of the STA, perform steps 604 and 605, or if no ID of the STA is read, perform step 606 of stopping reading resource indication information in a user part.

604. Obtain a location, in the user part, of the resource indication information corresponding to the identifier of the station. Specifically, step 604 may be: obtaining order information of the identifier of the station (the order information may be specifically embodied as an order number, a type of a station preceding the station, a quantity of stations preceding the station, or the like) in the STA ID list of the second part of the foregoing common part, and calculating an offset of the resource indication information of the station in the user part (that is, an offset relative to an end time or an end location of the second part of the foregoing common part) according to the order information, a resource indication information length of an OFDMA STA in the user part, and a resource indication information length of an MU-MIMO STA in the user part, to perform step 605.

605. Jump to the corresponding location in the user part according to the foregoing calculated offset of the resource indication information of the station in the user part, and read the resource indication information of the STA.

More specifically, the STA ID list includes an indicator that is corresponding to the STA ID and that identifies a type of the station, and the indicator is used to indicate that the station is an OFDMA STA or an MU-MIMO STA. The foregoing step 604 may include: obtaining the station in the STA ID list, learning that there are n OFDMA users and m MU-MIMO users before the station, and learning that an offset of the station in the user part is n×T_OFDMA+m× T_MU, where T_OFDMA and T_MU are respective resource indication information lengths of an OFDMA STA and an MU-MIMO STA in the user part.

In a specific solution, in the STA ID list, a STA ID of the OFDMA STA is first arranged, and then a STA ID of the MU-MIMO STA is arranged. The foregoing step 604 may include: obtaining the station in an OFDMA STA list, where an order number of the station is n and n is a natural number, and learning that an offset of the station in the user part is (n−1)×T_OFDMA, where T_OFDMA is a resource indication information length of the OFDMA STA in the user part. Certainly, there are many alternative solutions for the foregoing numbering rule and offset algorithm. For example, the number n starts from 0, 1, 2, 3, . . . , or the like, and a calculation formula for the offset is n×T_OFDMA, that is, n is a positive integer starting from 0; or obtaining the station in an MU-MIMO STA list, where an order number of the station is m (the station and the station in the OFDMA STA list are not numbered consecutively, and m is a natural number), and learning that an offset of the station in the user part is N×T_OFDMA+(m−1)×T_MU, where N is a total quantity of stations carried in an OFDMA STA list, T_OFDMA is a resource indication information length of the OFDMA STA in the user part, and T_MU is a resource indication information length of the MU-MIMO STA in the user part.

In another specific solution, in the STA ID list, an order of the OFDMA STA and an order of the MU-MIMO STA are not distinguished, that is, two relatively independent tables are not required.

It may be understood by a person skilled in the art that the foregoing data frame may further have another variation. For example, in another implementation manner, a difference from the foregoing implementation manner is: in both a common part and a user part, a scheduled uplink user is separate from or independent from a scheduled downlink user.

Figure 7:
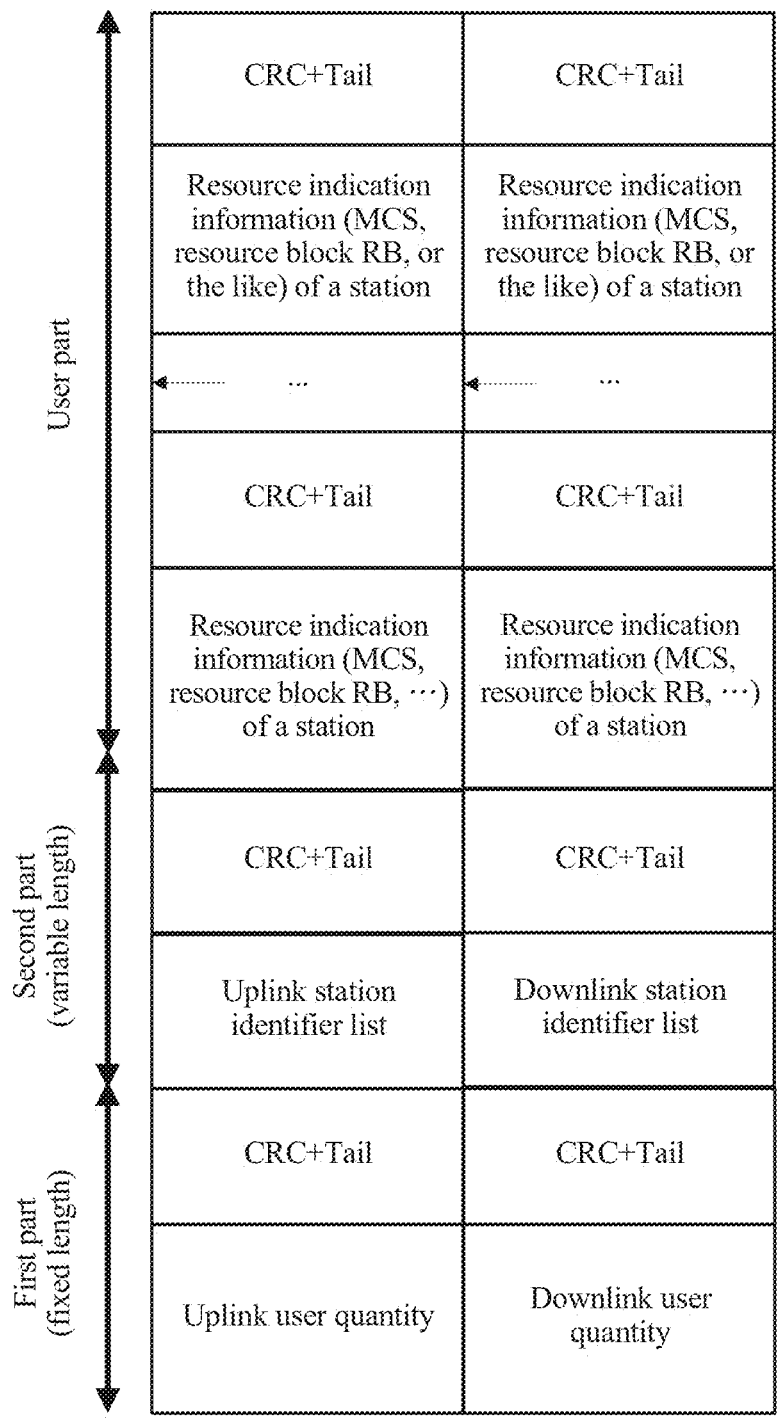
FIG. 7 is a schematic diagram of a SIG-B according to an embodiment of the present invention.

As shown in FIG. 7, a first part of the foregoing common part includes quantity information of an uplink scheduled user and quantity information of a downlink scheduled user, that is, the first part includes a quantity of downlink DL scheduled users and a quantity of uplink UL scheduled users, where the quantity of downlink DL scheduled users is independent from the quantity of uplink UL scheduled users. Identification information of scheduled stations is placed in different blocks in a second part of a common part of a SIG-B according to DL and UL.

Figure 8:
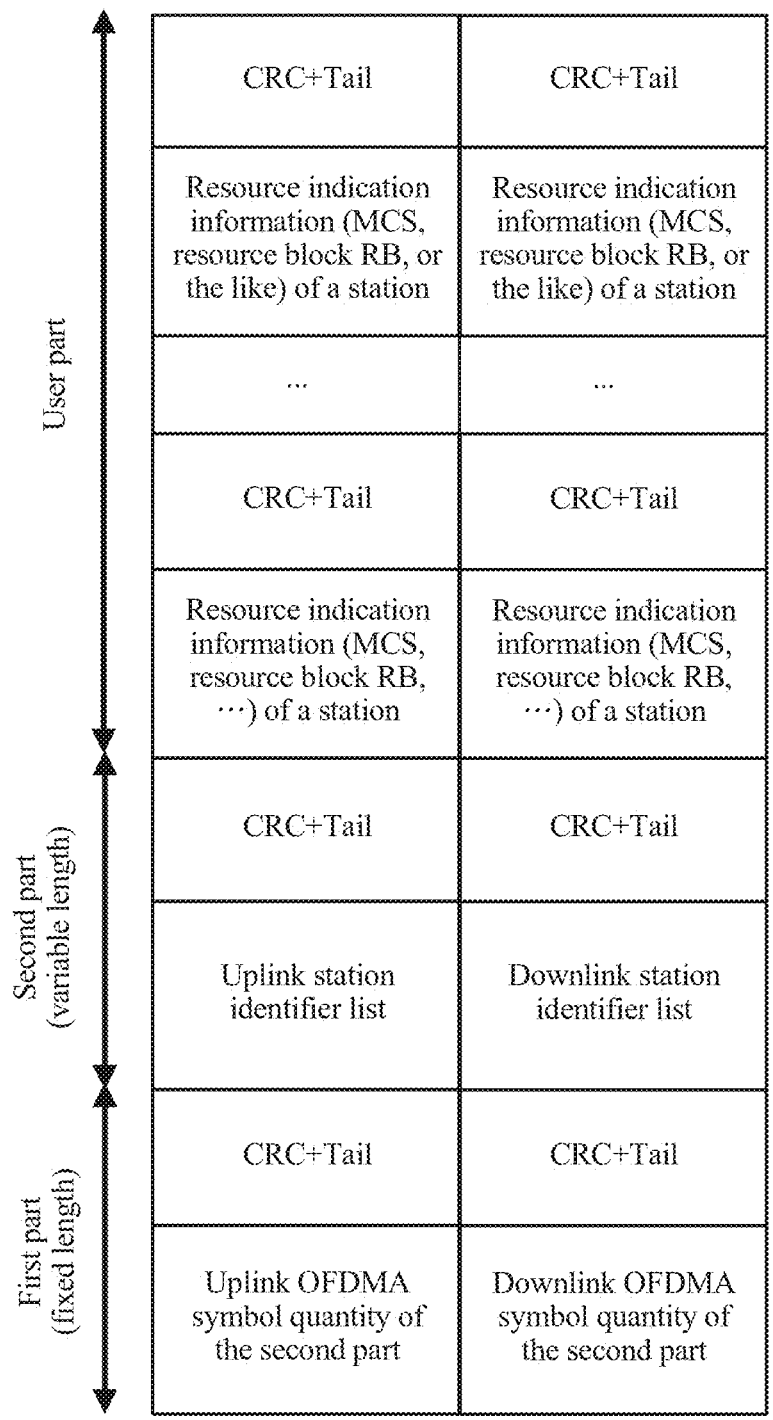
FIG. 8 is a schematic diagram of a SIG-B according to another embodiment of the present invention.

As shown in FIG. 8, the first part of the foregoing common part includes uplink OFDMA symbol information and downlink OFDMA symbol information that are of the common part (or the second part of the common part), and the OFDMA information may be an OFDMA symbol quantity or an OFDMA symbol end time. Identifiers of scheduled stations are placed in different blocks in the second part of the common part according to DL and UL.

Correspondingly, after an access point generates and sends a data frame in the foregoing structure, a station receives the foregoing data frame and performs processing. Specifically, a process of reading the common part by the station that receives the data frame includes: first reading a first part of the common part, and obtaining quantity information of a DL scheduled station and quantity information of a UL scheduled station, or uplink OFDMA symbol information and downlink OFDMA symbol information that are of the common part (or the second part of the common part), so as to obtain an end location or an end time of the second part; then reading the second part of the common part, and determining whether an identifier of the station is included in a STA ID list; if the identifier of the station is included in the STA ID list, and an order number of the station in the STA ID list includes a downlink user number and an uplink user number, obtaining the order number of the station in the STA ID list, calculating an offset by using an uplink resource indication information length in the user part and a downlink indication information length in the user part, and jumping to resource indication information that is in the user part and that is corresponding to the station, to perform decoding, where the uplink resource indication information length is different from the downlink indication information length.

In a specific example, a STA i reads a downlink STA ID list, learns that there are n1 downlink OFDMA users and m1 downlink MU users before the STA i, and may learn that an offset of the STA i in a downlink part of the user part is n1 ×T_OFDMA 1+m1×T_MU 1, where T_OFDMA 1 and T_MU 1 are downlink resource indication information lengths of an OFDMA STA and an MU STA in the user part, and n1 and m1 are natural numbers.

Then the STA i reads an uplink STA ID list, learns that there are n2 uplink OFDMA users and m2 uplink MU users before the STA i, and may learn that an offset of the STA i in an uplink part of the user part is n2 ×T_OFDMA 2+m2 ×T_MU 2, where T_OFDMA 2 and T_MU 2 are uplink resource indication information lengths of an OFDMA STA and an MU STA in the user part, and n2 and m2 are natural numbers.

In a preferable specific solution, information of a same user type may be placed together in the second part of the common part in a specific order. For example, the information successively includes: a STA ID list of a downlink OFDMA STA user, a STA ID list of a downlink MU-MIMO user, a STA ID list of an uplink OFDMA STA user, and a STA ID list of an uplink MU-MIMO user.

In this way, if a STA obtains an order n1 of the STA in a downlink OFDMA STA list, the STA may learn that an offset of the STA in the downlink part of the user part is n1×T_OFDMA 1, where T_OFDMA 1 is a resource indication information length of an OFDMA STA in the downlink part of the user part, and n1 is a positive integer starting from 0.

If a STA obtains an order n2 of the station in an uplink OFDMA STA list, the STA may learn that an offset of the STA in the uplink part of the user part is n2 ×T_OFDMA 2, where T_OFDMA 2 is a resource indication information length of an OFDMA STA in the downlink part of the user part, and n2 is a positive integer starting from 0.

Based on separate uplink and downlink displacement, a STA that sends an uplink request separately decodes the scheduled downlink user list and the scheduled uplink user list that are of the common part, and performs corresponding processing: if it is determined that the station is not included in the uplink user list of the common part or the downlink user list of the common part, stopping decoding; if it is determined that the station is included in the uplink user list or the downlink user part, separately determining a location of the station in the uplink part of the user part or a location of the station in the downlink part of the user part, and separately reading uplink communication resource information or downlink communication resource information.

A STA that does not send an uplink request decodes only the downlink user list of the common part and performs corresponding processing: if it is determined that the station is not included in the downlink user list of the common part, stopping decoding; or if it is determined that the station is included in the downlink user list, determining a location of the station in the downlink part of the user part.

Apparently, in the foregoing solution, a station may further perform decoding according to an actual situation, and stop decoding for an unnecessary situation. This is beneficial to capability saving or power saving.

In addition, in a communication resource indication field structure shown in FIG. 3, FIG. 4, FIG. 7, or FIG. 8, the user part includes communication resource information of each scheduled station. The communication resource information of each scheduled station includes but is not limited to data MCS information of each scheduled station, resource indication information (for example, a frequency resource location, a time domain location, or a resource block location), MCS information of a data part, spatial flow quantity information, power control information, uplink and downlink indication information, low-density parity-check code (LDPC for short) indication information, space time block code (STBC for short) information, or cyclic redundancy check (CRC for short), or tail bit information. Specifically, a function of the LDPC indication information is to indicate whether the user uses an LDPC code. The STBC information is used to indicate whether the user uses an STBC. The CRC is a common error check code in a data communications field and is used to determine whether transmission information is correct.

Preferably, MCS information of 2 bits may be included after a STA ID of a second part of a common part of a communication resource information field (for example, a SIG-B) of a data frame, to indicate an MCS used for resource indication information of the user in a user part. In this way, different MCS information may be used for resource indication information of users in the user part.

length. The PPDU packet length refers to a data length used for transmitting a single physical layer data packet. The TXOP length refers to a transmit opportunity time length for transmitting multiple PPDU packets. The subframe length refers to a length of a transmission time unit, and may be the PPDU packet length, or may be the TXOP length. Generally, the PPDU packet length, the TXOP length, and the subframe length are not included in the common part of the SIG-B at the same time.

Preferably, 2 to 3 bits may be used in other control field (for example, a SIG-A) information of the data frame to indicate MCS information required for transmitting SIG-B information, or the data frame includes only MCS information of a common part of a SIG-B and a length of SIG-B information or a symbol quantity of SIG-B information.

Preferably, guard interval (GI for short) information is included in the other control field (for example, the SIG-A) information of the data frame or the common part (for example, the first part) of the foregoing SIG-B, and the GI information is used to indicate whether the current data frame is in an outdoor mode or in an indoor mode. When the GI information indicates that the data frame is in the outdoor mode, the common part of the SIG-B may further include length information, for example, a length of the SIG-B, a PPDU packet length, a TXOP length, a subframe length, an uplink subframe length, or a downlink subframe length. When the GI information indicates that the data frame is in the indoor mode, length information of a legacy preamble part may be used, and the common part of the SIG-B does not include the length information. In this way, overheads of the SIG-B part can be reduced.

In the foregoing implementation manners, a communication resource indication field (for example, referred to as a SIG-B) is divided into two parts, so that a speed of searching for content of the communication resource indication field by a user can be improved. In another aspect, an unscheduled station may not search for and interpret the content of the SIG-B any longer. This may be beneficial to capability saving of a user without scheduling information.

Figure 9:
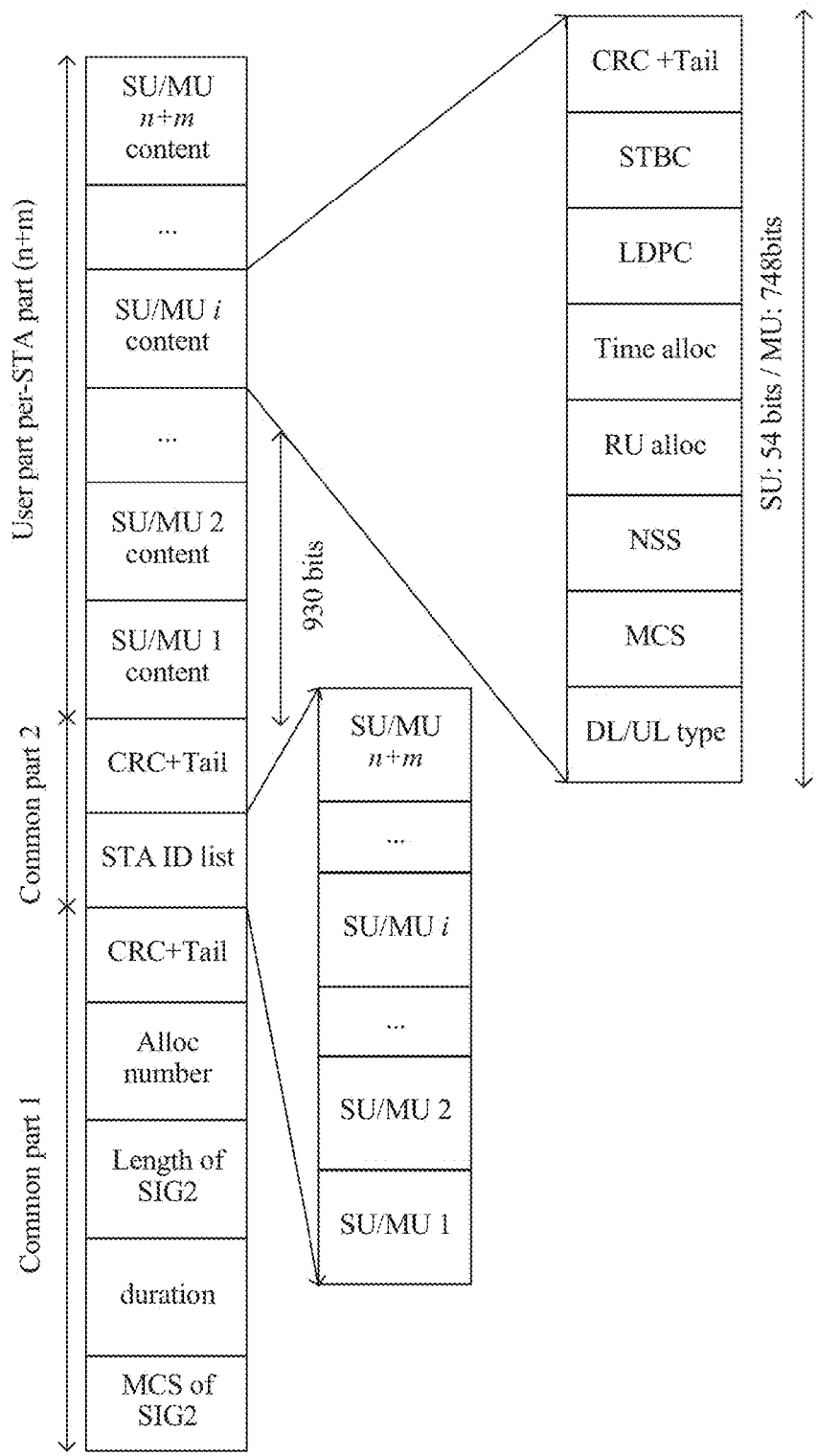
FIG. 9 is a schematic structural diagram of a SIG-B according to an embodiment of the present invention.

For clearer understanding of the foregoing implementation manners, the following Table 1-4 and FIG. 9 are an instance of a common part of a SIG-B.

TABLE 1-4

Instance of a SIG-B part

MCS of SIG-B: 2 bits (used to indicate an MCS of a SIG-B)
Length of SIG-B: 5 bits (used to indicate a length of an SIG-B)
DL/UL Indicator: 2 bit (for non-cascading) (used to indicate uplink or downlink)
DL/UL Switch Time: 6 bits (for cascading) (used to indicate an uplink or downlink switch time)
    OFDMA SU/MU Indicator: 1 bit (used to indicate a user type)
    Duration: 15 bits (used to indicate duration)
    Duration: 15 bits (used to indicate duration)
Allocation number: 7 bit (maximal 128 allocations), indicates the end of SIG-B's common part (used to indicate a total quantity of scheduled users, so as to determine an end location or an end time of a common part of a SIG-B)
STA ID (SU/MU) list: 10 × (n + m) bits, n is number of scheduled OFDMA SU, m is number of MU (station list)
CRC + Tail: 8 + 6 = 14 bits In the foregoing implementation manners, the common part of the SIG-B may further include length information such as a length of the SIG-B, a physical layer convergence procedure (PLCP) protocol data unit (PPDU) packet length, a transmission opportunity (TXOP) length, a subframe length, an uplink subframe length, or a downlink subframe Referring to FIG. 9, FIG. 9 is a specific instance in which a station i searches a common part for a station identifier of the station i. In this instance, there are 10 OFDMA scheduled single users (displayed as single users (SU) in the figure) and 5 user groups (displayed as multiple users (MU) in the figure). Communication resource information of one SU occupies 54 bits, and communication resource information of one MU occupies 78 bits. In the foregoing implementation manners, the station i may find communication resource information of the station i in a location of an offset of 10×54+5×78=930 bits after an end location or an end time of the common part, and perform decoding.

Correspondingly, another implementation manner provides a resource indication processing apparatus (not shown) that is used in a wireless local area network in which an OFDMA technology is used. The resource indication processing apparatus includes a processing unit that is configured to send or receive a frame that includes a communication resource indication field. The communication resource indication field is described in the foregoing implementation manners, and details are not described. For a specific structure and content of the frame, reference may be made to the foregoing implementation manners, and details are not described herein. The processing unit may be a general purpose processor, a digital signal processor, an application-specific integrated circuit, a field programmable gate array or another programmable logic device, a discrete gate or a transistor logic device, or a discrete hardware component, which may implement or execute various methods, steps, and logic block diagrams that are disclosed in the embodiments of the present invention. The general purpose processor may be a microprocessor, any conventional processor, or the like. The steps of the method disclosed with reference to the embodiments of the present invention may be directly performed by a hardware processor, or may be performed by using a combination of hardware in the processor and a software module. It may be easily understood that the foregoing resource indication processing apparatus may be in an access point when specifically sending a frame that includes a communication resource indication field; and may be in a station when specifically receiving a frame that includes a communication resource indication field.

Figure 10:
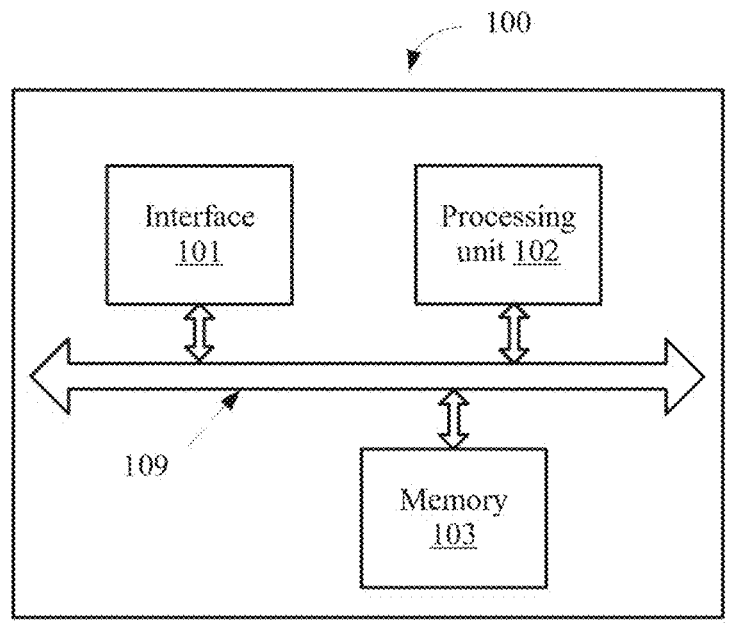
FIG. 10 is a block diagram of an access point according to an embodiment of the present invention.

FIG. 10 is a block diagram of an access point according to another embodiment of the present invention. The access point in FIG. 10 includes an interface 101, a processing unit 102, and a memory 103. The processing unit 102 controls an operation of an access point 100. The memory 103 may include a read-only memory and a random access memory, and provides an instruction and data to the processing unit 102. A part of the memory 103 may further include a nonvolatile random access memory (NVRAM). All components of the access point 100 are coupled together by using a bus system 109. In addition to a data bus, the bus system 109 further includes a power bus, a control bus, and a status signal bus. However, for clarity of description, various buses are marked as the bus system 109 in the figure.

The method for sending the foregoing various frames that is disclosed in the foregoing embodiments of the present invention may be applied to the processing unit 102, or implemented by the processing unit 102. In an implementation process, steps of the foregoing method may be completed by using an integrated logic circuit of hardware in the processing unit 102 or an instruction in a software form. The processing unit 102 may be a general purpose processor, a digital signal processor, an application-specific integrated circuit, a field-programmable gate array or another programmable logic device, a discrete gate or a transistor logic device, or a discrete hardware component, which may implement or execute various methods, steps, and logic block diagrams that are disclosed in the embodiments of the present invention. The general purpose processor may be a microprocessor, any conventional processor, or the like. The steps of the method disclosed with reference to the embodiments of the present invention may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 103. The processing unit 102 reads information in the memory 103, and completes the steps of the foregoing method with reference to the hardware of the processing unit 102.

Figure 11:
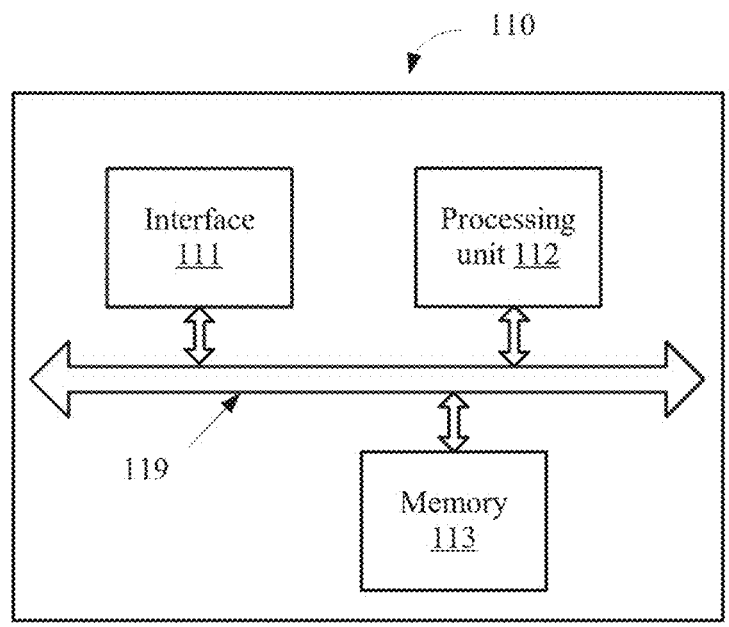
FIG. 11 is a block diagram of a station according to an embodiment of the present invention.

FIG. 11 is a block diagram of a station according to another embodiment of the present invention. The access point in FIG. 11 includes an interface 111, a processing unit 112, and a memory 113. The processing unit 112 controls an operation of a station 110. The memory 113 may include a read-only memory and a random access memory, and provides an instruction and data to the processing unit 112. A part of the memory 113 may further include a nonvolatile random access memory (NVRAM). All components of the station 110 are coupled together by using a bus system 119. In addition to a data bus, the bus system 119 further includes a power bus, a control bus, and a status signal bus. However, for clarity of description, various buses are marked as the bus system 119 in the figure.

The method for receiving and processing the foregoing various frames that is disclosed in the foregoing embodiments of the present invention may be applied to the processing unit 112, or implemented by the processing unit 112. In an implementation process, steps of the foregoing method may be completed by using an integrated logic circuit of hardware in the processing unit 112 or an instruction in a software form. The processing unit 112 may be a general purpose processor, a digital signal processor, an application-specific integrated circuit, a field-programmable gate array or another programmable logic device, a discrete gate or a transistor logic device, or a discrete hardware component, which may implement or execute various methods, steps, and logic block diagrams that are disclosed in the embodiments of the present invention. The general purpose processor may be a microprocessor, any conventional processor, or the like. The steps of the method disclosed with reference to the embodiments of the present invention may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 113. The processing unit 112 reads information in the memory 113, and completes the steps of the foregoing method with reference to the hardware of the processing unit 112.

Specifically, the memory 113 stores an instruction that instructs the processing unit 112 to perform the following operations: determining resource status information, where the resource status information indicates a busy/idle state of a sub-resource of a channel resource used for data transmission between an access point and a station; and sending the resource status information to the access point, so that the access point allocates a resource according to the resource status information.

It should be understood that "an embodiment" or "one embodiment" mentioned in the specification means that specific features, structures, or characters related to an embodiment are included in at least one embodiment of the present invention. Therefore, "in an embodiment" or "in one embodiment" in the entire specification may not necessarily refer to a same embodiment. In addition, these specific features, structures, or characters may be combined in one or more embodiments in any appropriate manner. Sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present embodiments may be implemented by hardware, firmware or a combination thereof. When the present embodiments are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital STA line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present embodiments includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what are described above are merely examples of embodiments of the technical solutions of the present embodiments, but are not intended to limit the protection scope of the present embodiments. Any modification, equivalent replacement, or improvement made without departing from the principle of the present embodiments shall fall within the protection scope of the present embodiments.

What is claimed is:

1. A method comprising:
generating, by an access point in a wireless local area network, a data frame that comprises a preamble, wherein the preamble comprises a signaling indication part B (SIG-B), wherein the SIG-B comprises a common part and a user part following the common part, wherein the common part indicates information for determining an end location or an end time of the common part, identification information of a scheduled station, and a location of communication resource information of the scheduled station in the user part, wherein the user part indicates the communication resource information of the scheduled station, and wherein the communication resource information comprises resource indication information, modulation and coding scheme (MCS) information of a data part, spatial flow quantity information, or power control information; and sending, by the access point, the data frame.

2. The method according to claim 1, wherein the identification information of the scheduled station in the common part comprises identification information of the scheduled station arranged in order, and wherein an order of the communication resource information of the scheduled station in the user part is the same as an order of the identification information of the scheduled station indicated in the common part, to determine a location of the communication resource information of the scheduled station in the user part according to the order of the identification information of the scheduled station.

3. The method according to claim 2, wherein the identification information of the scheduled station comprises identification information of the scheduled station arranged at random, identification information of the scheduled station arranged in ascending order of identifier sizes of the scheduled station, or identification information of the scheduled station arranged in descending order of identifier sizes of the scheduled station.

4. The method according to claim 1, wherein the common part comprises a first part with a fixed length and a second part with a non-fixed length that follows the first part, wherein the first part indicates the information for determining the end location or the end time of the common part, and wherein the first part comprises a quantity of scheduled stations, an orthogonal frequency division multiple access (OFDMA) symbol quantity of the common part or the second part or an OFDMA symbol end time of the common part or the second part, and wherein the second part indicates an identification information list of the scheduled station.

5. An access point in a wireless local area network, the access point comprising:

a processor; and a non-transitory computer readable storage medium storing a program for execution by the processor, the program including instructions to:

generate a data frame that comprises a preamble, wherein the preamble comprises a signaling indication part B (SIG-B), wherein the SIG-B comprises a common part and a user part following the common part, wherein the common part indicates information for determining an end location or an end time of the common part, identification information of a scheduled station, and a location of communication resource information of the scheduled station in the user part, wherein the user part indicates the communication resource information of the scheduled station, and wherein the communication resource information comprises resource indication information, modulation and coding scheme (MCS) information of a data part, spatial flow quantity information, or power control information; and transmit the data frame.

6. The access point according to claim 5, wherein the identification information of the scheduled station in the common part comprises identification information of the scheduled station that is arranged in order, and wherein an order of the communication resource information of the scheduled station in the user part is the same as an order of the identification information that is of the scheduled station that is indicated in the common part, to determine a location of the communication resource information of the scheduled station in the user part according to the order of the identification information of the scheduled station.

7. The access point according to claim 5, wherein the identification information of the scheduled station comprises identification information of the scheduled station that is arranged at random, identification information of the scheduled station that is arranged in ascending order of identifier sizes of the scheduled station, or identification information of the scheduled station that is arranged in descending order of identifier sizes of the scheduled station.

8. The access point according to either of claim 5, wherein the common part comprises a first part with a fixed length and a second part with a non-fixed length that follows the first part, wherein the first part indicates the information for determining the end location or the end time of the common part, and wherein first part comprises a quantity of scheduled stations, an orthogonal frequency division multiple access (OFDMA) symbol quantity of the common part or the second part, or an OFDMA symbol end time of the common part or the second part, and wherein the second part indicates an identification information list of the scheduled station.

* * * * *